United States Patent
Ohba et al.

(10) Patent No.: US 8,232,324 B2
(45) Date of Patent: Jul. 31, 2012

(54) ELECTROLYTE MEMBRANE-FORMING CURABLE RESIN COMPOSITION, AND PREPARATION OF ELECTROLYTE MEMBRANE AND ELECTROLYTE MEMBRANE/ELECTRODE ASSEMBLY

(75) Inventors: Toshio Ohba, Annaka (JP); Mitsuhito Takahashi, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 1365 days.

(21) Appl. No.: 11/357,205

(22) Filed: Feb. 21, 2006

(65) Prior Publication Data
US 2006/0194890 A1 Aug. 31, 2006

(30) Foreign Application Priority Data
Feb. 28, 2005 (JP) ................... 2005-053560

(51) Int. Cl.
*C08J 5/22* (2006.01)

(52) U.S. Cl. ............... 521/27; 521/30; 429/30; 429/33; 526/286; 524/261

(58) Field of Classification Search ........... 429/40, 429/309, 30, 33; 521/27, 30; 526/286; 524/261
See application file for complete search history.

(56) References Cited

U.S. PATENT DOCUMENTS

| 6,180,287 | B1* | 1/2001 | Watanabe et al. ......... 429/312 |
| 7,332,530 | B2* | 2/2008 | Kiefer et al. ............. 521/27 |
| 2002/0192528 | A1* | 12/2002 | Sixt et al. ............... 429/35 |
| 2004/0018410 | A1* | 1/2004 | Dai ...................... 429/33 |
| 2004/0097695 | A1* | 5/2004 | Yoon ..................... 528/350 |
| 2005/0187338 | A1* | 8/2005 | Ohba et al. .............. 524/540 |
| 2006/0041075 | A1* | 2/2006 | Kerr et al. ............... 525/242 |

FOREIGN PATENT DOCUMENTS

| JP | 2003-203646 | 7/2003 |
| JP | 2003-217342 | 7/2003 |
| JP | 2003-217343 | 7/2003 |
| JP | 2005-235625 | 9/2005 |
| WO | WO03/033576 A1 | 4/2003 |
| WO | WO-03/033576 A1 * | 4/2003 |

* cited by examiner

*Primary Examiner* — Peter D. Mulcahy
*Assistant Examiner* — Henry Hu
(74) *Attorney, Agent, or Firm* — Westerman, Hattori, Daniels & Adrian, LLP

(57) ABSTRACT

A curable resin composition comprising (a) a compound having at least one ethylenically unsaturated group and at least one ion conductive group, (b) a compound having at least two ethylenically unsaturated groups, (c) an organosilicon compound having at least two SiH groups, (d) a platinum group catalyst, and (e) a solvent is dried and cured by heating into a cured film having excellent ionic conduction and serving as electrolyte membrane. The electrolyte membrane and an electrolyte membrane/electrode assembly satisfy fuel cell-related properties including ionic conduction and film strength as well as productivity.

7 Claims, 1 Drawing Sheet

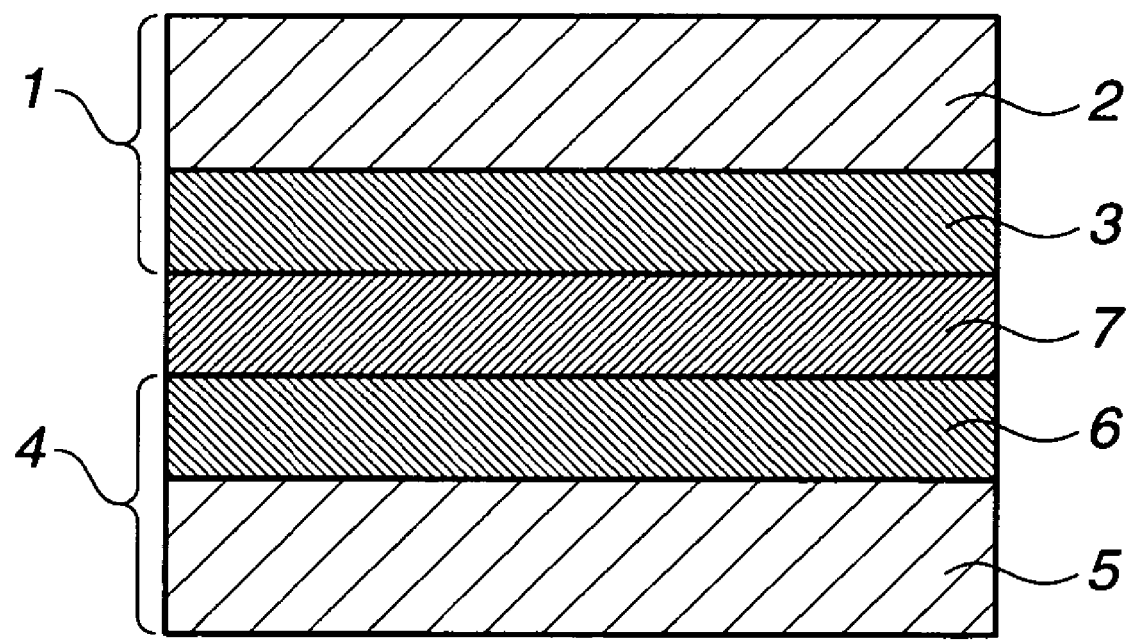

ELECTROLYTE MEMBRANE-FORMING CURABLE RESIN COMPOSITION, AND PREPARATION OF ELECTROLYTE MEMBRANE AND ELECTROLYTE MEMBRANE/ELECTRODE ASSEMBLY

CROSS-REFERENCE TO RELATED APPLICATION

This non-provisional application claims priority under 35 U.S.C. §119(a) on Patent Application No. 2005-053560 filed in Japan on Feb. 28, 2005, the entire contents of which are hereby incorporated by reference.

TECHNICAL FIELD

This invention relates to polymer electrolyte fuel cells. More particularly, it relates to electrolyte membrane-forming curable resin compositions, a method for preparing an electrolyte membrane, and a method for preparing an electrolyte membrane/electrode assembly.

BACKGROUND ART

Fuel cells using solid polymer electrolyte (SPE) membranes are expected to find widespread use as power supplies for electric cars and small-size auxiliary power supplies due to a low operating temperature below 100° C. and a high energy density. For such SPE fuel cells, constituent technologies relating to electrolyte membranes, platinum base catalysts, gas diffusion electrodes, and electrolyte membrane/electrode assemblies are important. Among others, the technology relating to electrolyte membranes is most important because they largely govern the performance of fuel cells.

In SPE fuel cells, an electrolyte membrane on its opposite sides is combined with a fuel diffusion electrode and an air diffusion electrode so that the electrolyte membrane and the electrodes form a substantially integral structure. Then the electrolyte membrane not only acts as an electrolyte for conducting protons, but also plays the role of a diaphragm for preventing a fuel (such as hydrogen or methanol) from directly mixing with an oxidant (such as air or oxygen) even under applied pressure.

From the electrolyte aspect, the electrolyte membrane is required to have a high ion (proton) transfer velocity, a high ion exchange capacity, and a high and constant water-retaining ability enough to maintain a low electric resistance. The role of a diaphragm requires the electrolyte membrane to have a high dynamic strength, dimensional stability, chemical stability during long-term service, and no extra permeation of hydrogen gas or methanol as the fuel and oxygen gas as the oxidant.

Electrolyte membranes used in early SPE fuel cells were ion exchange membranes of hydrocarbon resins obtained through copolymerization of styrene with divinyl benzene. These electrolyte membranes, however, lacked practical usefulness due to very low durability. Thereafter, perfluorosulfonic acid/PTFE copolymer membranes developed by E.I. duPont and commercially available under the trade mark "Nafion" have been widely used instead.

One problem associated with conventional fluororesin base electrolyte membranes as typified by Nafion is an increased cost because their manufacture starts from the synthesis of monomers and requires a number of steps. This becomes a substantial bar against practical applications. With respect to the thickness of electrolyte membranes, as the membrane becomes thinner, proton conduction becomes easier and hence, fuel cells provide better power generation characteristics. Thin electrolyte membranes, however, can be ruptured when an electrolyte membrane and electrodes are pressed together at elevated temperature to enhance the bond therebetween.

Efforts have been made to develop inexpensive electrolyte membranes that can replace the Nafion and similar membranes. There are known, for example, electrolyte membranes made of polyether ether ketone or similar hydrocarbon polymers having sulfonic acid groups introduced therein, and electrolyte membranes made of fluororesins to which styrene or similar aromatics are radiation grafted, with sulfonic acid groups being introduced into the aromatic rings. However, these electrolyte membranes after their film formation are joined to electrodes by pressing at elevated temperatures, which leaves problems of possible rupture of membranes and complex steps. The joining under heat and pressure does not always achieve a sufficient adhesion.

To improve the level of productivity and adhesion, JP-A 2003-203646 proposes to apply a solution of an electrolyte membrane in a solvent onto an electrode, and press bond the assembly with the solvent partially left therein. Since the electrolyte membrane has not been cured, only low adhesion is achieved.

JP-A 2003-217342 and JP-A 2003-217343 disclose crosslinking of electrolyte membranes for improved durability. Since solid electrolyte membranes are crosslinked, subsequent press bonding at elevated temperatures is necessary to fabricate an electrolyte membrane/electrode assembly.

Also, WO 03/033576 discloses to control the fuel permeability of an electrolyte membrane by impregnating the electrolyte membrane with a non-electrolyte monomer, followed by polymerization. The non-electrolyte monomer is cured. However, since the membrane subject to impregnation is in solid form, subsequent press bonding at elevated temperatures is necessary.

SUMMARY OF THE INVENTION

US Application 2005-0187338A1 (U.S. Ser. No. 11/057, 750, Japanese Patent Application No. 2004-044414) by the same assignee as the present invention proposes a curable resin composition comprising a monomer having at least one ethylenically unsaturated group and at least one ion conductive group in a molecule. In order that the composition cure into an electrolyte membrane having satisfactory properties, a cured film is prepared through copolymerization of the monomer with a functional group-containing oligomer. Because of radical reaction, the polymerization of monomers cannot always be driven to completion, resulting in a lower gel fraction.

An object of the present invention is to provide curable resin compositions which allow reaction to proceed to completion and form electrolyte membranes with a high gel fraction; a method for preparing electrolyte membranes; and a method for preparing electrolyte membrane/electrode assemblies.

The inventors have discovered that when a liquid curable resin composition comprising (a) a compound having at least one ethylenically unsaturated group and at least one ion conductive group or precursor group thereof in a molecule, (b) an optional compound having at least two ethylenically unsaturated groups and free of an ion conductive group or precursor group thereof in a molecule, (c) an organosilicon compound having at least two silicon-bonded hydrogen atoms in a molecule, (d) a platinum group catalyst, and (e) an optional solvent is cured through addition reaction, a cured film is obtained which has a high gel fraction and excellent ionic conduction and is thus useful as the electrolyte membrane for fuel cells. The cured film can be prepared in an efficient manner.

Additionally, by applying the curable resin composition onto a first electrode having a catalyst borne thereon, heating to form a cured film, and then disposing a second electrode having a catalyst borne thereon contiguous to the cured film; or by applying the curable resin composition onto a first electrode having a catalyst borne thereon, disposing a second electrode having a catalyst borne thereon contiguous to the applied composition, and then heating for curing the resin composition to form a cured film, an electrolyte membrane/electrode assembly is prepared in an industrially advantageous manner in which an electrolyte membrane and electrodes are tightly bonded without a need for hot pressing and which is useful for fuel cells.

In a first aspect, the invention provides an electrolyte membrane-forming curable resin composition comprising (a) 100 parts by weight of a compound having at least one ethylenically unsaturated group and at least one ion conductive group or precursor group thereof in a molecule, (b) 0 to 300 parts by weight of a compound having at least two ethylenically unsaturated groups and free of an ion conductive group or precursor group thereof in a molecule, (c) 10 to 300 parts by weight of an organosilicon compound having at least two silicon-bonded hydrogen atoms in a molecule, (d) a catalytic amount of a platinum group catalyst, and (e) 0 to 5,000 parts by weight of a solvent.

In a preferred embodiment, the molar ratio of silicon-bonded hydrogen atoms to ethylenically unsaturated groups is in a range of 0.5 to 5. Preferably the ion conductive group or precursor group thereof in component (a) is present in an amount of 0.1 to 5.0 moles per kilogram of components (a), (b) and (c) combined.

In a second aspect, the invention provides a method for preparing an electrolyte membrane comprising the steps of applying the curable resin composition onto a substrate in such an amount as to give a build-up of up to 200 μm after solvent evaporation, and heating the applied composition for evaporating off the solvent and effecting addition reaction, thereby forming a cured film.

In the event the compound as component (a) has at least one ion conductive precursor group, the method for preparing an electrolyte membrane comprises the steps of applying the curable resin composition onto a substrate in such an amount as to give a build-up of up to 200 μm after solvent evaporation, heating the applied composition for evaporating off the solvent and effecting addition reaction, thereby forming a cured film, and converting the ion conductive precursor groups to ion conductive groups.

In a third aspect, the invention provides a method for preparing an electrolyte membrane/electrode assembly, comprising the steps of applying the curable resin composition onto a first electrode having a catalyst borne thereon, heating the applied composition for evaporating off the solvent and effecting addition reaction, thereby forming a cured film, and thereafter disposing a second electrode having a catalyst borne thereon contiguous to the cured film. An alternative method involves the steps of applying the curable resin composition onto a first electrode having a catalyst borne thereon, disposing a second electrode having a catalyst borne thereon contiguous to the applied composition, and thereafter heating the applied composition for evaporating off the solvent and effecting addition reaction, thereby forming a cured film.

BENEFITS OF THE INVENTION

The curable resin composition of the invention is cured into a cured film having excellent ionic conduction and serving as electrolyte membrane. There are obtained an electrolyte membrane and an electrolyte membrane/electrode assembly for use in fuel cells which satisfy cell-related properties including ionic conduction and film strength as well as productivity at the same time. The electrolyte membrane produced by the method of the invention can have a reduced thickness which allows the film resistance to be reduced and is thus quite useful as the SPE membrane in fuel cells and especially direct methanol-air fuel cells. The full completion of curing reaction in the cured film suggests that the power generation characteristics are kept unchanged over a long period of time.

BRIEF DESCRIPTION OF THE DRAWING

The only figure, FIG. 1 is a cross-sectional view illustrating one typical method of preparing an electrolyte membrane/electrode assembly according to the invention.

DESCRIPTION OF THE PREFERRED EMBODIMENTS

Component (a) in the curable resin composition of the invention for forming electrolyte membrane is a compound having at least one ethylenically unsaturated group and at least one ion conductive group or precursor group thereof in a molecule. Examples of suitable ethylenically unsaturated groups include alkenyl groups such as vinyl, allyl, propenyl, butenyl and hexenyl; alkenyl ether groups such as vinyl ether and allyl ether; and (meth)acryloyl groups. Suitable ion conductive groups include carboxylic acid groups (—COOH) and sulfonic acid groups (—$SO_3H$). Examples of the compound include, but are not limited to, (meth)acrylic acid, styrenesulfonic acid, allylbenzenesulfonic acid, allyloxybenzenesulfonic acid, vinylsulfonic acid, fluorovinylsulfonic acid, perfluoroalkylsulfonic acid fluorovinyl ethers, and perfluorovinyl ether sulfonic acid and alkali metal salts thereof, perfluoroalkylsulfonyl fluoride fluorovinyl ether, allyl glycidyl ether, glycidyl (meth)acrylate monomers, and polybutadienes containing epoxy and vinyl groups. Of these, the compounds containing epoxy and vinyl groups are preferred for ease of addition reaction and cured film formation.

It is noted that those compounds having a sulfonic acid group or a precursor group of sulfonic acid group as the ion conductive group are preferred for higher ionic conductivity. Suitable precursor groups of sulfonic acid groups include, but are not limited to, sulfonyl fluoride, sulfonic acid metal salts, and a glycidyl group which is convertible to a sulfonic acid metal salt with the aid of sodium sulfite or the like.

It is preferred from the standpoint of ionic conductivity that the ion conductive group or precursor group thereof in component (a) be present in an amount of 0.1 to 5.0 moles, more preferably 0.5 to 2.0 moles per kilogram of components (a), (b) and (c) combined. On this basis, less than 0.1 mole of the ion conductive group may provide less ionic conduction whereas more than 5.0 moles may allow for extra fuel permeation.

Component (b) is a compound having at least two ethylenically unsaturated groups and free of an ion conductive group or precursor group thereof in a molecule. Any compounds satisfying these requirements are useful. Examples include hydrocarbon compounds, polyether compounds, fluorine compounds and silicone compounds having ethylenically unsaturated groups at opposite ends and/or side chains of their molecular chain. Those compounds which are liquid or solid at room temperature (25° C.) are preferred, but not limiting examples. Examples of ethylenically unsaturated groups include alkenyl groups such as vinyl, allyl and hexenyl, alkenyl ether groups such as vinyl ether and allyl ether, and (meth)acryloyl groups, with the alkenyl groups being preferred for addition reaction.

Suitable hydrocarbon compounds having ethylenically unsaturated groups include 1,5-hexadiene, 1,6-heptadiene, 1,9-decadiene, divinyl benzene, and 1,4-butadiene oligomers.

Suitable polyether compounds having ethylenically unsaturated groups include polyethylene glycol diallyl ether, polypropylene glycol diallyl ether, polytetramethylene glycol diallyl ether, and diallyl ethers of styrene-propylene glycol copolymers.

Suitable fluorine compounds having ethylenically unsaturated groups include, but are not limited to, alkenyl-containing perfluoro compounds having the formula:

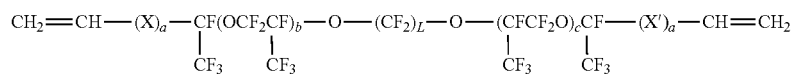

wherein a is independently 0 or 1, L is an integer of 2 to 6, b and c each are an integer of 0 to 200, X is independently —$CH_2$—, —$CH_2O$—, —$CH_2OCH_2$— or —Y—NR—CO— wherein Y is —$CH_2$— or a group of the structural formula (Z):

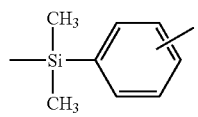

(inclusive of o-, m- and p-positions), and R is hydrogen, methyl, phenyl or allyl; X' is —$CH_2$—, —$OCH_2$—, —$CH_2OCH_2$— or —CO—NR—Y'— wherein R is as defined above and Y' is —$CH_2$— or a group of the structural formula (Z'):

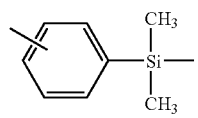

(inclusive of o-, m- and p-positions).

Suitable silicone compounds having ethylenically unsaturated groups include organopolysiloxanes having the average compositional formula:

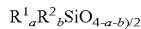

wherein $R^1$ is each independently a substituted or unsubstituted monovalent hydrocarbon group other than alkenyl, $R^2$ is an alkenyl group, subscripts a and b are numbers satisfying $0 \leq a < 3$, $0 < b \leq 3$, and $1 \leq a+b \leq 3$, the organopolysiloxanes preferably having at least two silicon-bonded alkenyl groups in a molecule. Specifically, $R^1$ is selected from monovalent hydrocarbon groups of 1 to 12 carbon atoms, more preferably 1 to 10 carbon atoms, for example, alkyl groups, cycloalkyl groups, aryl groups such as phenyl, and aralkyl groups such as benzyl. Typical of the organopolysiloxanes are those of the following formulae.

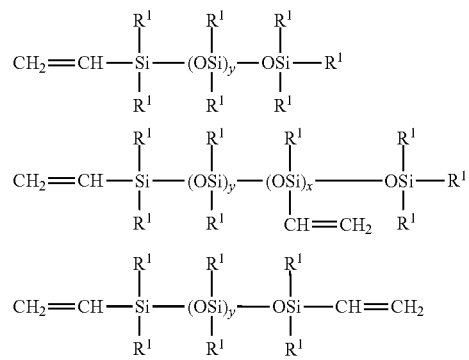

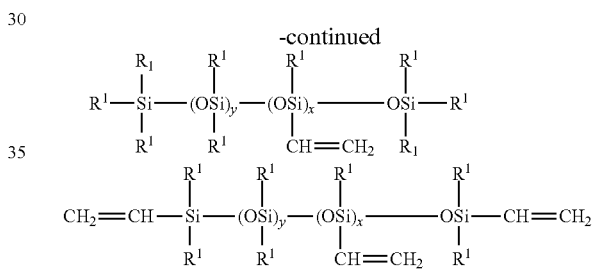

Herein, $R^1$ is as defined above, x is an integer of at least 1, and y is an integer inclusive of 0, and preferably x is an integer of 1 to 20, and y is an integer of 10 to 1,000.

An amount of component (b) compounded is 0 to 300 parts by weight per 100 parts by weight of component (a) because more than 300 parts by weight of component (b) may lead to a cured film with a lower ionic conductivity. The preferred amount of component (b) is 50 to 200 parts by weight per 100 parts by weight of component (a).

Component (c) is an organosilicon compound having at least two hydrogen atoms directly bonded to silicon atoms (i.e., SiH groups) in a molecule. It plays the role of a crosslinker that undergoes addition reaction to ethylenically unsaturated groups for curing a coating. No particular limit is imposed on the organosilicon compound as long as at least two silicon-bonded hydrogen atoms are included per molecule. Suitable organosilicon compounds include organohydrogenpolysiloxanes of the average compositional formula:

wherein R is each independently selected from monovalent hydrocarbon groups of 1 to 20 carbon atoms, especially 1 to 6 carbon atoms, such as alkyl and aryl groups, and subscripts c and d are numbers satisfying $0 \leq c < 3$, $0 < d \leq 3$, and $1 \leq c+d \leq 3$.

Examples of the organohydrogenpolysiloxane include 1,1,3,3-tetramethyldisiloxane, 1,3,5,7-tetramethylcyclotetrasiloxane, trimethylsiloxy end-capped methylhydrogenpolysiloxane, trimethylsiloxy end-capped dimethylsiloxane-methylhydrogen-siloxane copolymers, dimethylhydrogensiloxy end-capped dimethylpolysiloxane, dimethylhydrogensiloxy end-capped dimethylsiloxane-methylhydrogensiloxane copolymers, trimethylsiloxy end-capped methylhydrogensiloxane-diphenylsiloxane copolymers, trimethylsiloxy end-capped methylhydrogensiloxane-diphenylsiloxane-dimethylsiloxane copolymers, copolymers consisting of $(CH_3)_2HSiO_{1/2}$ units and $SiO_{4/2}$ units, copolymers consisting of $(CH_3)_2HSiO_{1/2}$ units, $(CH_3)_3SiO_{1/2}$ units and $SiO_{4/2}$ units, and copolymers consisting of $(CH_3)_2HSiO_{1/2}$ units, $SiO_{4/2}$ units and $(C_6H_5)_3SiO_{1/2}$ units. Note that the term "end-capped" means that a copolymer is capped at both ends.

More preferred are α,ω-(bistrimethylsilyl)polymethyl-hydrogenpolysiloxanes of the structure shown below.

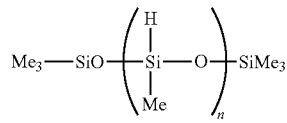

Herein Me is methyl and n is an integer of 2 to 45.

The organosilicon compounds used as component (c) further include compounds of the following formula:

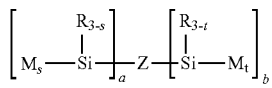

wherein a and b are 0 or 1, with the proviso that a and b are not equal to 0 at the same time, Z is hydrogen, —R, -M or -Q-Rf if either one of a and b is 0, and Z is -Q-, —Rf— or -Q-Rf'-Q- if both of a and b are 1, R is each independently selected from monovalent hydrocarbon groups of 1 to 20 carbon atoms, especially 1 to 6 carbon atoms, such as alkyl and aryl groups, M is a group of the formula (i):

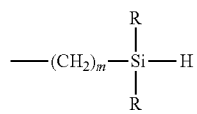

(i)

wherein m is an integer of 1 to 4 and R is as defined above, Q is a divalent organic group of 1 to 15 carbon atoms which may contain an ether bond (—O—), amide bond, carbonyl bond or the like, such as alkylene, arylene or a combination thereof, Rf is a monovalent perfluoroalkyl, perfluorooxyalkyl, alkyl or oxyalkyl group, Rf' is a divalent perfluoroalkylene, perfluorooxyalkylene, alkylene or oxyalkylene group, s is 1, 2 or 3, and t is 0, 1, 2 or 3.

Illustrative examples of the foregoing organosilicon compounds are given below. Note that Me is methyl.

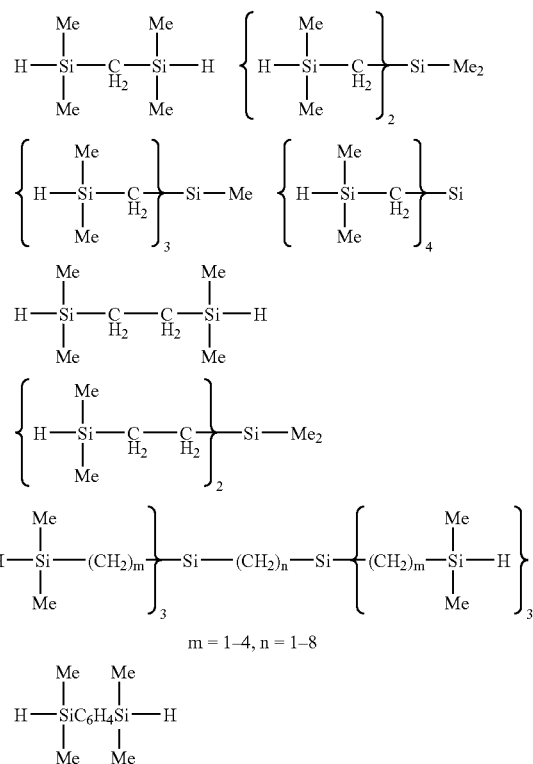

m = 1–4, n = 1–8

For compatibility with and dispersion in components (a) and (b) and uniformity after curing, those compounds having at least one monovalent perfluoroalkyl, monovalent perfluorooxyalkyl, divalent perfluorooxyalkylene or divalent perfluorooxyalkylene group in a molecule are useful.

With respect to Rf, the monovalent perfluoroalkyl groups are preferably of the formula: $C_gF_{2g+1}$— wherein g is an integer of 1 to 20, preferably 2 to 10. The divalent perfluoroalkylene groups are preferably of the formula: —$C_gF_{2g}$— wherein g is an integer of 1 to 20, preferably 2 to 10.

The monovalent perfluorooxyalkyl groups are preferably of 1 to 500 carbon atoms, more preferably 1 to 300 carbon atoms, and even more preferably 1 to 200 carbon atoms. Some preferred examples are shown below.

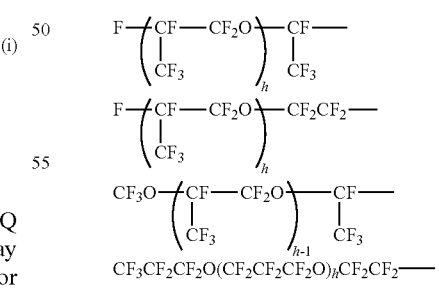

Herein h is an integer of 1 to 5.

The divalent perfluorooxyalkylene groups are preferably of 1 to 500 carbon atoms, more preferably 1 to 300 carbon atoms, and even more preferably 1 to 200 carbon atoms. Some preferred examples are shown below.

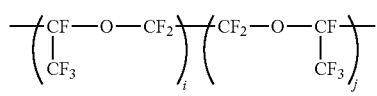

Herein i+j is an integer of 2 to 100.

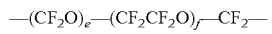

Herein e and f each are an integer of 1 to 50.

These perfluoro(oxy)alkyl and perfluoro(oxy)alkylene groups may be bonded to silicon atoms directly or through a divalent linking group Q. The divalent linking group Q is preferably of 2 to 12 carbon atoms, and typically selected from alkylene groups, arylene groups, and combinations thereof, which may be separated by an ether bond oxygen atom, amide bond, carbonyl bond or the like.

In addition to the monovalent organic group containing a mono- or di-valent fluorinated substituent group, i.e., perfluoroalkyl, perfluorooxyalkyl, perfluoroalkylene or perfluorooxyalkylene group, the organosilicon compound used as component (c) further has a monovalent substituent group R bonded to a silicon atom. Examples of the substituent group R include substituted or unsubstituted hydrocarbon groups of 1 to 20 carbon atoms, for example, alkyl groups such as methyl, ethyl, propyl, butyl, hexyl, cyclohexyl, octyl and decyl, alkenyl groups such as vinyl and allyl, aryl groups such as phenyl, tolyl and naphthyl, aralkyl groups such as benzyl and phenylethyl, and substituted forms of the foregoing groups in which some hydrogen atoms are substituted by chlorine atoms, cyano groups or the like, such as chloromethyl, chloropropyl and cyanoethyl.

The number of silicon atoms per molecule in the organosilicon compound is typically from 2 to 60, preferably from 3 to 30, though not limited thereto.

An amount of component (c) compounded is 10 to 300 parts by weight per 100 parts by weight of component (a). Less than 10 parts by weight of component (b) may result in under-cure whereas more than 300 parts by weight may cause foaming and allow for variations with time of such properties as hardness and elongation. The preferred amount of component (c) is 20 to 100 parts by weight per 100 parts by weight of component (a). Typically component (c) is compounded in such amounts as to supply 0.5 to 5.0 moles, more preferably 1 to 2 moles of SiH groups per mole of total ethylenically unsaturated groups in components (a) and (b).

Component (d) is a hydrosilylation catalyst which is typically selected from platinum group metals such as Pt, Rh and Pd, and compounds thereof. Exemplary platinum compounds include chloroplatinic acid, complexes of chloroplatinic acid with olefins such as ethylene, complexes of chloroplatinic acid with alcohols and vinylsiloxanes, and metallic platinum supported on silica, alumina or carbon, though are not limited thereto.

Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph denotes phenyl.

In case addition reaction catalyst poisons such as sulfur compounds are present, rhodium catalysts are preferred because they are little poisoned and have a high catalysis for hydrosilylation reaction.

The amount of the catalyst used is not particularly limited. A catalytic amount may be sufficient to achieve the desired curing rate. From the economical standpoint or for obtaining satisfactory cured products, an appropriate amount is to give 0.1 to 1,000 ppm, more preferably 0.1 to 500 ppm of platinum group metal based on the total weight of the curable resin composition.

Component (e) is a solvent. The type of solvent is not particularly limited as long as it serves to adjust the viscosity of the composition. Those solvents in which the components are uniformly dissolvable are preferred. Suitable solvents include ketones such as acetone and methyl ethyl ketone, esters such as ethyl acetate and butyl acetate, ethers such as tetrahydrofuran and dioxane, aromatic hydrocarbons such as benzene and toluene, aliphatic or cycloaliphatic hydrocarbons such as n-heptane, n-hexane, and cyclohexane, and polar solvents such as N,N-dimethylformamide, N,N-dimethylacetamide, dimethyl sulfoxide and water, which are used alone or in admixture. Of these, polar solvents are preferred. The amount of component (e) used is 0 to 5,000 parts by weight per 100 parts by weight of component (a). More than 5,000 parts by weight of the solvent may provide a liquid composition with too low a viscosity, which causes cissing and other problems upon application.

The electrolyte membrane in the form of a cured film made of the inventive composition typically has a thickness of up to 200 μm, and desirably 1 to 50 μm. A film of more than 200 μm has a greater film resistance when used as the electrolyte membrane in a fuel cell, leading to a reduced output. A film of less than 1 μm may provide a less barrier to hydrogen gas or methanol as the fuel in the fuel cell, leading to a reduced output.

In one embodiment of the invention, the curable resin composition is applied onto a substrate in such an amount as to give a build-up of up to 200 μm after solvent evaporation, and the applied composition is then heated for evaporating off the solvent and effecting addition reaction, thereby forming a cured film. The substrate may be selected from a variety of materials depending on a particular purpose. Most often, the substrate is an electrode for fuel cells. A cured film of the inventive composition may be formed on an electrode having a catalyst borne thereon as an electrolyte membrane in a fuel cell. The heating conditions include a temperature of about 25 to 200° C., especially about 70 to 150° C. and a time of about 1 to 120 minutes, especially about 3 to 30 minutes.

In an embodiment wherein the composition comprising a compound having an ion conductive precursor group is cured, the ion conductive precursor groups in the cured film may be converted to ion conductive groups by suitable treatment. For example, the sulfonic acid metal salt in the cured film is ion exchanged with an acid such as hydrochloric acid or sulfuric acid. The glycidyl group is treated with sodium sulfite or the like to form a sulfonic acid metal salt, which is then treated with an acid.

The electrolyte membrane according to the invention is disposed contiguous to and between first and second electrodes each having a catalyst borne thereon to form an electrode/electrolyte membrane/electrode sandwich for fuel cells. Specifically, the electrolyte membrane/electrode assembly is prepared by either of the following:

method (i) involving applying a liquid curable resin composition onto a first electrode having a catalyst borne thereon to form a coating, heating the coating for evaporating off the solvent to the full extent or to such an extent that part of the solvent is left, for forming a cured film, and disposing a second electrode having a catalyst borne thereon contiguous to the cured film, and method (ii) involving applying a liquid curable resin composition onto a first electrode having a catalyst borne thereon to form a coating, disposing a second electrode having a catalyst borne thereon contiguous to the uncured coating, and heating for curing the coating to form a cured film between the electrodes.

Referring to FIG. 1, method (ii) is illustrated. An air electrode 1 includes a catalyst layer 3 coated on a carbon paper 2. Similarly, a fuel electrode 4 includes a catalyst layer 6 coated on a carbon paper 5. A coating 7 of the resin composition (or an electrolyte membrane resulting from curing thereof) is disposed between the electrodes. For example, the assembly is manufactured by forming the coating 7 on the catalyst layer 6 of the fuel electrode 4, placing the air electrode 1 thereon such that the catalyst layer 3 is contiguous to the coating 7, and then heating for curing the coating 7, obtaining a cured film or electrolyte membrane.

The electrode having a catalyst borne thereon may be a conventional fuel cell electrode (either fuel electrode or air electrode) on which a catalyst is borne. The construction and material of the electrode may be selected from those well known for fuel cells. The catalyst may also be selected from those well known for fuel cells, for example, platinum base catalysts.

In the above method, a coating of the composition or an electrolyte membrane may be joined to electrodes by compression bonding at room temperature and a very low pressure of about 0.05 to 5 kgf/cm$^2$ using a press or the like. A firm bond is established between the electrolyte membrane and the electrodes without a need for high temperature/pressure pressing.

The electrolyte membrane and the electrolyte membrane/electrode assembly according to the invention are advantageously used in fuel cells. The fuel cell includes a fuel electrode, an air electrode, and a SPE membrane in thin film form disposed therebetween and tightly bonded thereto. A catalyst layer, a fuel diffusion layer and a separator are disposed on both sides of the SPE membrane to construct a fuel cell having improved power generation.

EXAMPLE

Examples of the invention are given below together with Comparative Examples by way of illustration and not by way of limitation. All parts are by weight.

Example 1

An electrolyte membrane-forming curable resin composition A was prepared by mixing 100 parts of polybutadiene having epoxy and vinyl groups within a common molecule, BF-1000 (Asahi Denka Kogyo Co., Ltd., epoxy equivalent 220, vinyl equivalent 70) with 137 parts of bissilylbenzene H(CH$_3$)$_2$SiC$_6$H$_4$Si(CH$_3$)$_2$H, 1.0 part of a toluene solution of a catalyst in the form of chloroplatinic acid modified with CH$_2$=CHSi(Me)$_2$OSi(Me)$_2$CH=CH$_2$ (platinum concentration 1.0 wt %), 0.4 part of a 50% toluene solution of ethynyl cyclohexanol as an addition reaction regulating agent, and 100 parts of toluene. The composition A was deaerated in vacuum. Then, using an applicator, the composition A was applied onto a glass plate to a build-up of about 200 μm. The coating was heated at 100° C. for one hour to form a cured film of 130 μm thick after the solvent had evaporated off. The cured film was immersed in acetone at 25° C. for 16 hours, removed, and dried at 70° C. for 4 hours. A percent weight change was determined according to the following equation:

$$\text{gel fraction} = W_d/W_i \times 100\%$$

wherein Wi is the weight of the initial film and Wd is the weight of the dry film, finding a gel fraction of 99%.

The cured film was kept in an aqueous solution containing 10 g of sodium sulfite, 3 g of sodium hydrogen sulfite, 10 g of isopropyl alcohol and 77 g of water, at 120° C. for 24 hours for reaction to convert the epoxy groups to sodium sulfonate. Then the film was immersed in 1N hydrochloric acid at room temperature for 3 hours, yielding a film containing sulfonic acid.

The resulting film was immersed in pure water at 25° C. for 24 hours, after which it was taken out and wiped on the surface with gauze. Using an impedance/gain-phase analyzer 1260 (Schulumberger Technologies) and platinum plates as the electrodes, a proton conductivity at 25° C. was measured to be 0.07 s/cm.

Example 2

A 5% isopropyl alcohol solution of Nafion (Aldrich) and carbon having 20 wt % of platinum borne thereon, Vulcan XC72 (E-Tek Inc.) were kneaded to form a paste. Using a wire bar, this catalyst paste was applied onto a carbon paper TGPH090 (Toray Co., Ltd.) so as to give a coating weight of 3.3 mg/cm$^2$ of Pt catalyst. The coating was dried in a hot air circulating dryer at 120° C. for 5 minutes, forming an electrode (fuel electrode).

Using an applicator, the liquid resin composition A was applied onto this electrode to form a coating having a thickness of about 50 μm. A similarly constructed electrode (air electrode) was disposed on the coating. The three-layer laminate was press bonded by moving a roller at 5 kgf/cm$^2$ and room temperature over two back and forth strokes. The three-layer laminate was held in a hot air circulating dryer at 100° C. for one hour. The liquid resin composition A effectively cured, and the cured film exhibited a firm bond to both the electrodes. As in Example 1, the proton conductivity at 25° C. of this cured film was measured to be 0.08 s/cm.

Example 3

An electrolyte membrane-forming curable resin composition B was prepared by mixing 100 parts of tetrafluoroethylenesulfonyl fluoride allyl ether (SynQuest Laboratories, Inc.) and 84 parts of polybutadiene having vinyl groups in a molecule, G-1000 (Nippon Soda Co., Ltd., vinyl equivalent 57) with 184 parts of bissilylbenzene H(CH$_3$)$_2$SiC$_6$H$_4$Si(CH$_3$)$_2$H, 0.04 part of acetylacetonatorhodium, and 100 parts of toluene. The composition B was deaerated in vacuum. Then, using an applicator, the composition B was applied onto a glass plate to a build-up of about 200 μm. The coating was heated at 100° C. for one hour to form a cured film of 150 μm thick after the solvent had evaporated off.

The cured film was immersed in acetone at 25° C. for 16 hours, removed, and dried at 70° C. for 4 hours. A percent weight change was determined as in Example 1, finding a gel fraction of 97%.

The cured film was kept in aqueous 1N sodium hydroxide at 80° C. for 3 hours for reaction to convert the sulfonyl fluoride groups to sodium sulfonate. Then the film was immersed in 1N hydrochloric acid at room temperature for 3 hours, yielding a film containing sulfonic acid.

The resulting film was immersed in pure water at 25° C. for 24 hours, after which it was taken out and wiped on the surface with gauze. Using an impedance/gain-phase analyzer 1260 (Schulumberger Technologies) and platinum plates as the electrodes, a proton conductivity at 25° C. was measured to be 0.06 s/cm.

COMPARATIVE EXAMPLE 1

A reactor was charged with 100 g of polytetramethylene glycol having a number average molecular weight of 1,000 and 0.1 g of 2,6-di-tert-butylhydroxytoluene. In a nitrogen stream at 65-70° C., 34.8 g of 2,4-tolylene diisocyanate was added dropwise to the reactor. After the completion of dropwise addition, the reactor was kept at 70° C. for 2 hours, followed by addition of 0.02 g of dibutyltin dilaurate. In dry air, 23.2 g of 2-hydroxyethyl acrylate was added dropwise. The reactor was kept at 70° C. for a further 5 hours, obtaining a polyether urethane acrylate oligomer having a number average molecular weight of 1,580 (Oligomer B).

70 parts of Oligomer B was mixed with 30 parts of glycidyl methacrylate and 1.0 part of asobisisobutyronitrile to form a liquid resin composition C having a viscosity of 1,200 mPa·s at 25° C.

Next, using an applicator, the liquid resin composition C was applied onto a glass plate to a build-up of 50 μm. The coating was heated in a nitrogen atmosphere at 100° C. for 30 minutes to form a cured film. This film was examined as in Example 1, finding a lower gel fraction of 88%.

COMPARATIVE EXAMPLE 2

An ion-exchange membrane having perfluorosulfonate groups, Nafion 112 (trade name, E.I. duPont) was interposed between the fuel electrode (anode) and the air electrode (cathode) which were prepared in Example 2. The stack was press bonded by moving a roller at 5 kgf/cm² and room temperature over two back and forth strokes, but the components did not bond together.

COMPARATIVE EXAMPLE 3

A 20% alcohol solution of Nafion (Aldrich) was applied onto the fuel electrode (anode) which was prepared in Example 1, and dried at 80° C. for 20 minutes, forming an electrolyte membrane having a thickness of about 50 μm. The membrane cracked and partially separated apart from the electrode.

Japanese Patent Application No. 2005-053560 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An electrolyte membrane-forming curable resin composition comprising
    (a) 100 parts by weight of a compound having at least one ethylenically unsaturated group and at least one ion conductive group or precursor group thereof in a molecule, wherein said ion conductive group or precursor group thereof is selected from the group consisting of a carboxylic acid group, a sulfonic acid group, a sulfonyl fluoride and sulfonic acid metal salts,
    (b) 0 to 300 parts by weight of a compound having at least two ethylenically unsaturated groups and free of an ion conductive group or precursor group thereof in a molecule,
    (c) 10 to 300 parts by weight of an organosilicon compound having at least two silicon-bonded hydrogen atoms in a molecule,
    (d) a hydrosilylation catalytic amount of a platinum group catalyst, and
    (e) 0 to 5,000 parts by weight of a solvent.

2. The curable resin composition of claim 1 wherein the molar ratio of silicon-bonded hydrogen atoms to ethylenically unsaturated groups is in a range of 0.5 to 5.

3. The curable resin composition of claim 1 wherein the ion conductive group or precursor group thereof in component (a) is present in an amount of 0.1 to 5.0 moles per kilogram of components (a), (b) and (c) combined.

4. The curable resin composition of claim 1, wherein the ion conducting group is a carboxylic acid group.

5. The curable resin composition of claim 1, wherein the ion conducting group is a sulfonic acid group.

6. The curable resin composition of claim 1, wherein the ion conducting group is a sulfonyl fluoride group.

7. The curable resin composition of claim 1, wherein the ion conducting group is a sulfonic acid metal salt.

* * * * *